United States Patent Office 3,423,818
Patented Jan. 28, 1969

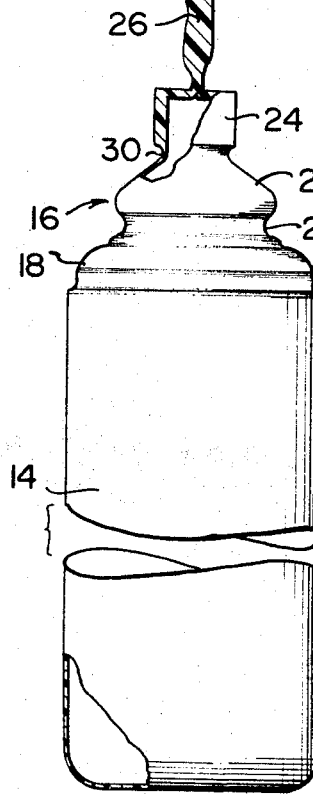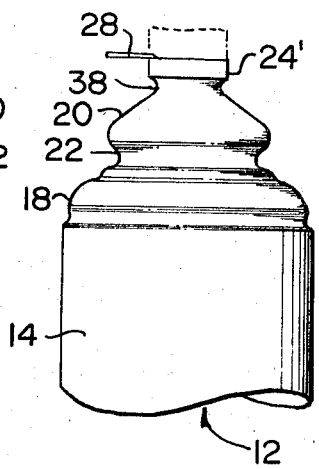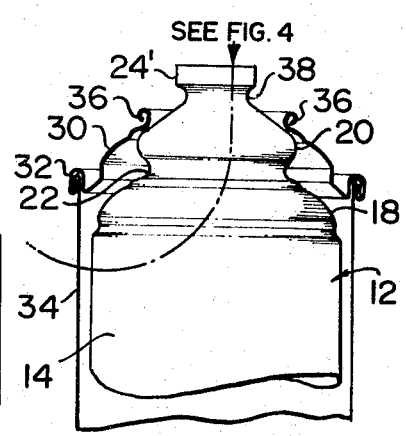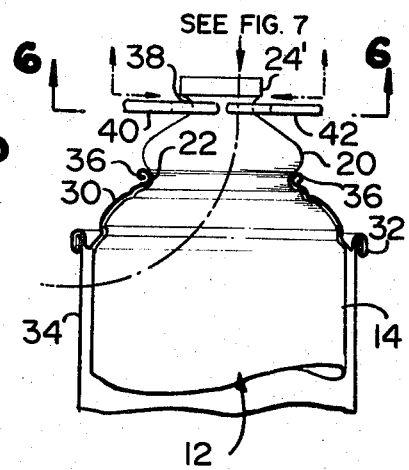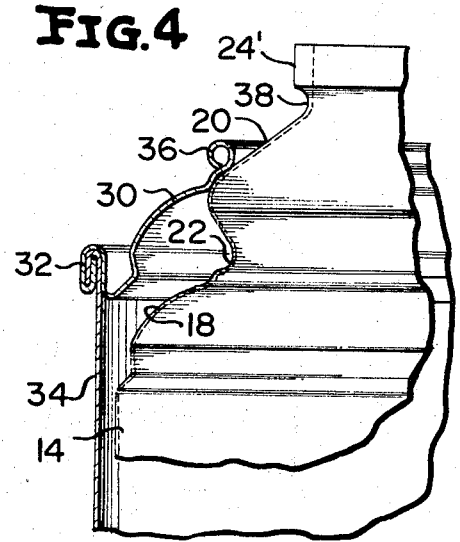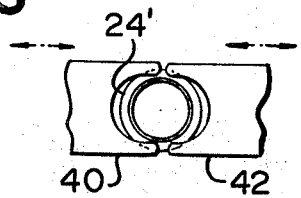

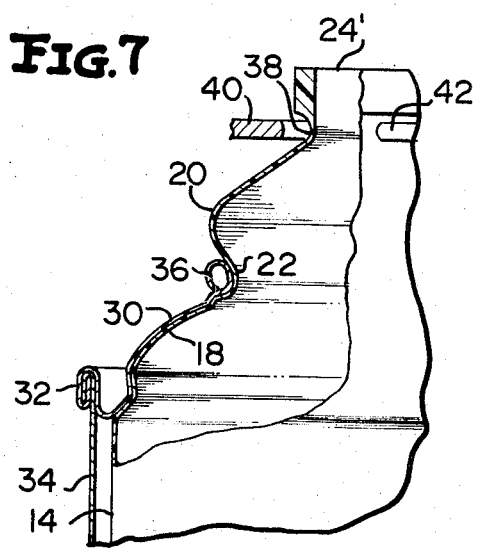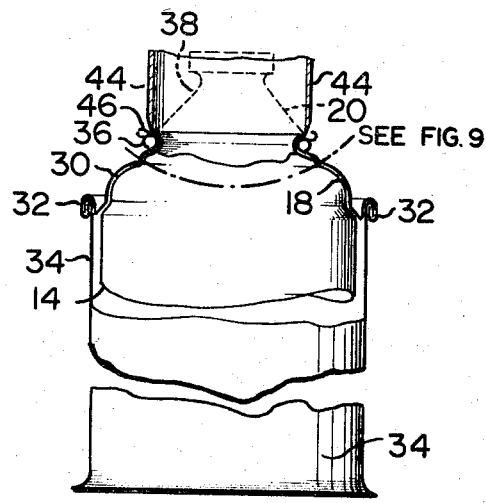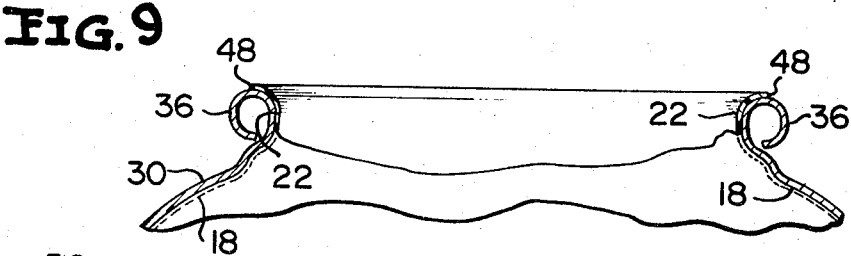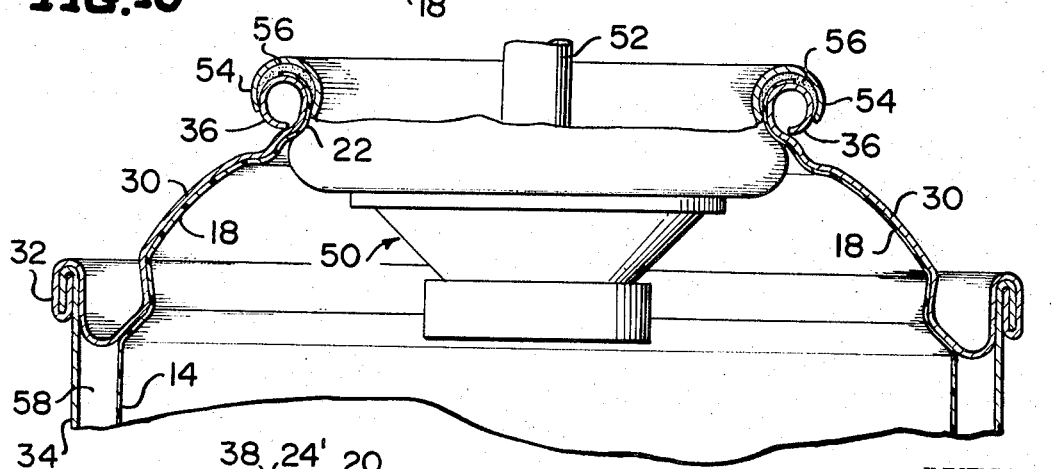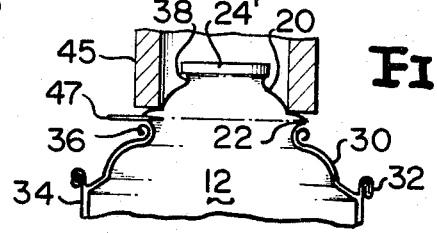

3,423,818
METHOD OF PRODUCING COLLAPSIBLE PLASTIC LINER AND ASSEMBLING LINER TO AEROSOL CONTAINER
Herbert S. Ruekberg, Highland Park, Ill., assignor to Continental Can Company, Inc., New York, N.Y., a corporation of New York
Filed Mar. 25, 1966, Ser. No. 537,570
U.S. Cl. 29—451                          10 Claims
Int. Cl. B23p *11/00;* B65d *35/14, 35/28*

ABSTRACT OF THE DISCLOSURE

This disclosure relates to a method of assembling a dispensing container by first providing a tubular container body open at one end and having a restricted opening at the other end defined by a radially inwardly projecting lip, and a liner having an intermediate portion of reduced section defining a lip receiving recess and having a projection at an end thereof adjacent the recess. The liner is passed into the container body through the one end thereof toward the other end until the projection passes through the restricted opening; thereafter the projection is gripped externally of the can body, and the liner is thereafter pulled farther through the restricted opening until the lip seats in the lip receiving recess.

---

The well known aerosol dispensing container has achieved wide acceptance and success. At present, a great number of products are distributed in aerosol containers, many of the products being heretofore deemed unsuitable for aerosol dispensing. To name a few, paints, insecticides, beauty aids, powders, food products, window cleaners, etc. have all undergone revolutionary packaging changes and are now dispensed in aerosol containers. In a conventional aerosol dispensing container, a rigid tubular member, usually of metal, is partially filled with the product to be dispensed and a dispensing valve is attached to the open end of the container. Thereafter, a suitable propellant in the form of a gas is introduced into the container which exerts a force against the product tending to urge the product out of the container through the dispensing valve. Upon actuation of the dispensing valve, the force exerted by the propellant will urge the product from the aerosol dispenser in the form of a fine mist or spray.

Since the foregoing described aerosol containers have achieved great acceptance in the consumer market and enjoy a high degree of success, increasing effort has been directed to the fabrication of containers of this type. In the matter of economics, the success of the item is diminished or even eradicated if the cost of the dispensing container is out of proportion to the cost of the product to be dispensed. That is to say, the convenience of an aerosol container may be overridden by economic considerations when, for example, a twenty-cent container is employed to dispense five cents worth of material.

Aerosol containers take many and varied forms and a primary consideration is the possible reaction between the propellant and the product to be dispensed. In many cases relating to the dispensing of non-edible products, the selection of the propellant receives little attention. However, in the packaging of volatile products, highly reactive products, edible products, etc., much attention may be directed to the selection of the propellant since reactions between the propellant and the product may oftentimes occur. This reaction results in contamination and degradation of the product and as such, is, of course, highly undesirable and to be avoided.

Accordingly, the need has arisen for an aerosol container which will maintain the propellant separated from the product. As such, the list of products that may be packaged in aerosol containers is expanded. The present invention is directed to this end by presenting a method of fabricating an aerosol container having a flexible inner liner to receive a product to be dispensed, the propellant being maintained between the inner liner and a surrounding, usually rigid, container body.

Therefore, it is the principal object of the present invention to improve methods for fabricating containers of the aerosol type.

It is a further object of the present invention to provide a method for fabricating an aerosol dispenser of the type which assures substantially complete evacuation of the product from the container.

It is a further object of the present invention to provide a method for fabricating an aerosol dispenser of the type which may be employed to dispense products and materials heretofore considered unfit for such packaging.

It is a further object of the present invention to provide a method for fabricating an aerosol dispenser of the type which permits separation of the propellant and the product to thereby prevent interaction of product and propellant.

It is a still further object of the present invention to provide a method for making an aerosol type dispenser which is readily assembled, economical to manufacture and conveniently adaptable to mass production techniques.

These and other objects of the present invention are accomplished by projecting a molded collapsible and flexible liner bearing a pulling stud and seating groove at one of its ends into a rigid tubular container capped with a dome having an annular lip formed thereupon. To obtain the necessary adherence between the upper annular opening of the container and the liner, usually of plastic, it is necessary that the upper extremity of the liner protruding through the opening of the container be of a larger diameter than the container opening or lip so that it rests over the annular lip at the top of the container and resists any forces that may tend to urge the liner downwardly into the container. The body diameter of the liner is substantially larger than the upper annular opening of the container. One of the problems that has been solved resided in assembling a flexible plastic liner through an orifice that was smaller than either end of the flexible liner. An attempt to push the liner through the container orifice would result in a collapse of the liner.

To overcome these difficulties, the liner was produced with an integral structure protruding above a seating groove. The protruding structure serves to lead the liner through the container and center it with the annular opening or lip in the dome formed at the top of the container. After the preliminary placement of the liner into the container, a portion of the protruding structure appears at the top annular opening of the container so that the protruding structure can be conveniently gripped by a device that will exert enough force to pull the liner to its final seated position with the lip receiving recess of the liner being in engagement with the annular lip of the dome of the container.

The protruding structure of the liner has a streamline design so that it can be easily pulled through an aperture that is smaller than the largest diameter of the protruding structure. It is a combination of pulling and the compressing action of the inner wall of the orifice at the top of the container (the dome) that permits the top structure or protruding structure to pass through the aperture that is smaller than the protruding structure of the liner.

After the structure protruding from the top of the liner has performed its function of aligning and seating the liner, it is severed from the upper lip of the liner, leaving sufficient plastic material lying over the upper annular lip of the container to keep the liner from falling back into the container when it is filled with the product that is to be packaged and dispensed.

The invention both as to its organization and method of operation together with further objects and advantages thereof will best be understood by reference to the following specification taken in conjunction with the accompanying drawings, in which:

FIGURE 1 is a side elevational view, partly in section, of a blow molded liner in its condition as it emerges from the mold;

FIGURE 2 is a fragmentary side elevational view and illustrating the step of trimming the neck to ready the liner for insertion into an outer tubular member such as a container;

FIGURE 3 is a fragmentary sectional view of a container and illustrating the liner in the process of being inserted into the container prior to the gripping and "snap-through" of the projecting neck.

FIGURE 4 is an enlarged fragmentary view and similar to the FIGURE 3;

FIGURE 5 is a view similar to the FIGURE 3 but showing the completion of the "snapping-through" of the projecting neck portion of the liner;

FIGURE 6 is a horizontal sectional view taken along the line 6—6 of the FIGURE 5 and illustrating the gripping and pulling means;

FIGURE 7 is a fragmentary enlarged view of the FIGURE 5 with portions of the liner being shown in section and illustrating the seating of the lip receiving groove on the annular lip of the dome of the container;

FIGURE 8 is a view similar to the FIGURE 5 but illustrating the step of trimming and removing the projecting neck of the liner;

FIGURE 9 is an enlarged fragmentary sectional view showing the liner completely positioned in the container as it would appear immediately following the step of the FIGURE 8;

FIGURE 10 is an enlarged sectional view illustrating the liner fully seated and in place with a dispensing valve positioned over the annular lip of the dome of the container and securing the liner in position; and FIGURE 11 is a sectional view illustrating another method of trimming and removing the projecting neck of the liner.

With reference to the FIGURE 1, a liner 12 is illustrated which may be of a flexible and collapsible material such as of plastic and may have been formed by a well known blow-molding process. Preferably, the liner 12 includes a liner body 14, which by way of example may be cylindrical, having a projecting neck 16 integrally formed thereto. The projecting neck 16 includes a contoured intermediate portion 18 joined to a generally conical portion 20 by a lip receiving recess 22. The conical portion 20 terminates at an integrally formed cap 24 to which is joined an unused tip 26 remaining from the molding process.

The FIGURE 2 illustrates a trimming step prior to the insertion of the liner 12 into a container and more specifically, a severing blade 28 is caused to advance across the cap 24 so as to remove the tip 26 and portions of the cap 24 from the conical portion 20, the remaining portion of the cap 24 being identified as 24'.

With reference to the FIGURES 3 and 4, the preassembly step is illustrated wherein the liner 12 is projected into a dome 30 secured by a double seam 32 to a container body 34. Formed on the upper surface of the dome 30 is a rolled annular lip 36 which when the liner 12 is in its final position, is snugly engaged by the lip receiving recess 22 of the liner 12. In the position shown in the FIGURES 3 and 4, the lower extension of the conical portion 20 is in contact with the surface of the dome 30 immediately below the annular lip 36. The cap 24' cooperates with a groove 38 formed at the junction of the conical portion 20 and the cap 24' to form a pulling stud to be hereinafter described. The liner 12 may be inserted into the container body 34, the lower end being open, to the position shown in the FIGURES 3 and 4 by any convenient means. Due to the flexibility and collapsibility of the liner 12, the liner 12 is not normally pushed past the position shown in the FIGURES 3 and 4 but is subsequently pulled into place, which will be described with reference to later figures.

It will be noted from the foregoing figures, that the body diameter, and more specifically that of the conical portion 20, of the liner 12 is substantially larger than the annular opening formed by the annular lip 36 of the dome 30. The problem thus solved, resides in assembling the flexible plastic liner 12 through the orifice in the dome 30 that is smaller than that of the liner 12. Any attempt to push the liner through the orifice in the dome 30, would result in a collapse of the liner 12.

In order to overcome these difficulties, it will be noted from the foregoing figures that the liner 12 is produced with an integral structure including the conical portion 20, the cap 24' and the groove 38 for gripping and pulling the liner 12 through the aperture in the dome 30.

More specifically, with reference to the FIGURE 5, a bifurcated fork means, best illustrated in the FIGURE 6 as including a first member 40 and a second member 42, are moved toward each other so that they grasp the liner 12 at the groove 38 and by an upward urging, snaps the liner 12 into place with the lip receiving recess 22 of the liner 12 in snug engagement with the annular lip 36 of the dome 30 which may be secured to the container body 34. It will be understood that the liner 12 may be so positioned in the dome 30 without a container body 34 being coupled to the dome 30.

The seating of the liner 12 in its final position is shown in the enlarged view of the FIGURE 7. It will be noted that the lip receiving recess 22 is resting over a portion of the annular lip 36 of the dome 30 and that the contoured intermediate portion 18 of the liner 12 closely conforms to the inner contoured surface of the dome 20. The protruding structure of the liner 12 is of a streamlined design so that it can be easily pulled through the aperture formed in the dome 30. It is a combination of the pulling force exerted by the members 40 and 42 and the compressing action of the annular lip 36 that permits the conical portion 20 of the liner 12 to "snap" through the aperture so formed in the dome 30. As soon as the normally large diameter of the conical portion 20 emerges from the orifice formed in the dome 30 by the annular lip 36, it substantially returns to its original shape and thus seats itself in the position shown in the FIGURES 5 and 7.

The FIGURE 8 illustrates the next step wherein after the pulling members 40 and 42 have been retracted, an annular cutter 44 is lowered so as to engage its severing surface 46 at a point approximately at the junction of the conical portion 20 and the lip receiving recess 22 so as to sever the conical portion 20, the cap 24' and the groove 38 from the liner 12. Rotation of the cutter 44 may facilitate the removal step.

The FIGURE 11 illustrates an alternate method of severing the conical portion 20, the cap 24' and the groove 38 from the liner 12. For example, a cylindrical holding member 45 may engage the conical portion 20 above the lip receiving recess 22 while a cutting blade 47 approaches the line 12 at a point approximately at the junction of the conical portion 20 and the lip receiving recess 22 while the assembly is rotated. Thus, the liner then appears as in FIGURE 9.

After the severing operation either the FIGURES 8 or 11, the liner appears as shown in the FIGURE 9 wherein the lip receiving recess 22 extends over the annular lip 36 of the dome 30, a distance slightly more than one-half the upper surface of the annular lip 36. It will be understood that the extent of the overlapping of the lip receiving recess on the annular lip 36 may be lesser or greater than that shown but in the illustration of the FIGURE 9, the seating and overlapping is sufficient so that the liner 12 remains in place during subsequent filling operations wherein the cylindrical body 14 of the liner 12 is filled with a product to be subsequently dispensed. As a matter of convenience, the upper surface of the lip receiving recess 22 will be identified as a surface 48.

In the terminal step shown in the FIGURE 10, a dispensing valve 50, shown symbolically, and having a dispensing tube 52 shown in broken outline, is secured to the annular lip 36 by any suitable means by causing a circular recess 54 of the valve 50 to surround the annular lip 36, and through the cooperation of an end sealing compound 56 applied to the surface 48 of the lip receiving recess 22 and the annular lip 36, effectively seals the liner 15 in place. In this manner, the product placed within the liner 12 is prevented from escaping. Thereafter, a gas propellant is introduced into the area 58 between the cylindrical body 14 of the liner 12 and the container body 34 so as to exert a force against the cylindrical body 14 and thereby permit the product to be dispensed through the valve 50 upon actuation of a dispensing actuator (not shown) coupled to the dispensing tube 52.

It will be understood that although the liner 12 has been referred to as having a cylindrical body 14, the liner may take other shapes.

Thus, there has been described and illustrated an aerosol container and a method for the fabrication of the container wherein a liner having an upper projecting surface is propelled partially into a container body so that the projecting surface of the liner extends beyond the terminal portion of the container body. Thereafter, the projecting portion is grasped by a pair of bifurcated members which exert a pulling force upon the liner so as to snap the liner into position with the lip receiving recess of the liner in snug engagement and seated upon the annular lip of the dome of the container. Subsequently, the projecting portion of the liner is removed and after the application of a product to be dispensed in the liner, a dispensing valve is positioned over the liner and the dome of the container. During the product filling operation, the liner remains snugly in place due to the outward force exerted by the lip receiving recess against the annular lip of the container dome.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

I claim:

1. A method of assembling a liner with a tubular member open at one end and having a restricted opening at the other end defined by a radially inwardly projecting lip, the liner having an intermediate portion of reduced section defining a lip receiving recess and having a projection at an end thereof adjacent the recess, with the projection being of a size to freely pass through the restricted opening, said method comprising the steps of passing the liner into the tubular member through the one end thereof toward the other end until the projection passes freely and without deformation through the restricted opening, thereafter gripping the projection externally of said tubular member, and then pulling the liner further through the restricted opening utilizing the projection until the lip seats in the lip receiving recess.

2. The method as defined in claim 1 including the further step of removing the projection from the liner at the point of departure of the lip receiving recess from the lip.

3. The method as defined in claim 2 wherein the step of removing is by severing with an annular cutter.

4. The method as defined in claim 2 wherein the step of removing is by positioning a cutting blade against the projection and rotating at least the liner.

5. The method of claim 1 together with a preliminary step of shaping the projection in the form of a pulling stud by severing from the liner excess material resulting from the forming of the liner.

6. The method of claim 1 wherein the liner is formed of flexible material and the liner is temporarily reduced in section intermediate the projection and the lip sealing recess as the liner is pulled through the lip.

7. The method of claim 1 wherein the liner is formed of a resilient material and material of the liner intermediate the projection and the lip receiving recess is axially tensioned and stretched with the section thereof being temporarily reduced as the liner is pulled through the lip.

8. A method of assembling a liner with a tubular member open at one end and having a restricted opening at the other end defined by a radially inwardly projecting lip, the liner having an intermediate portion of reduced section defining a lip receiving recess and having a projection at an end thereof adjacent the recess, said method comprising the steps of passing the liner into the tubular member through the one end thereof until the projection passes through the restricted opening, pulling the liner further through the restricted opening utilizing the projection until the lip seats in the lip receiving recess, and severing the projection from the liner at a point adjacent the lip receiving recess after the step of pulling.

9. A method of assembling a liner with a tubular member open at one end and having a restricted opening at the other end defined by a radially inwardly projecting lip, the liner having an intermediate portion of reduced section defining a lip receiving recess and having a projection at an end thereof adjacent the recess, said method comprising the steps of passing the liner into the tubular member through the one end thereof until the projection passes through the restricted opening, pulling the liner further through the restricted opening utilizing the projection until the lip seats in the lip receiving recess, the tubular member being a dispensing container including a dome, and securing a dispensing valve over the lip to thereby seal the liner portion defining the lip receiving recess between the valve and the lip.

10. A method of assembling a liner with a tubular member open at one end and having a restricted opening at the other end defined by a radially inwardly projecting lip, the liner having an intermediate portion of reduced section defining a lip receiving recess and having a projection at an end thereof adjacent the recesss, said method comprising the steps of passing the liner into the tubular member through the one end thereof until the projection passes through the restricted opening, pulling the liner further through the restricted opening utilizing the projection until the lip seats in the lip receiving recess, severing the projection from the liner at a point adjacent the lip receiving recess after the step of pulling, and securing a closure over the lip to thereby seal the material of the liner defining the lip receiving recess between the closure and the lip.

References Cited

UNITED STATES PATENTS

| 2,468,286 | 4/1949 | Behlert | 29—450 X |
| 2,590,264 | 3/1952 | Meyers et al. | |
| 2,759,255 | 8/1956 | Prince | 29—450 |
| 3,225,967 | 12/1965 | Heimgartner | 222—95 X |

JAMES L. JONES, Jr., *Primary Examiner.*

U.S. Cl. X.R.

29—453; 222—95